United States Patent
Miyazoe et al.

(10) Patent No.: US 6,286,544 B1
(45) Date of Patent: Sep. 11, 2001

(54) REGULATOR

(75) Inventors: Shinji Miyazoe; Hiroyuki Katsuta; Masamichi Tajima, all of Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/496,056

(22) Filed: Feb. 2, 2000

(30) Foreign Application Priority Data

Feb. 26, 1999 (JP) ..................................... 11-050153

(51) Int. Cl.$^7$ ............................... G05D 16/06; F16K 1/42
(52) U.S. Cl. ......................................... 137/505.41; 251/362
(58) Field of Search ............................... 137/505, 505.38, 137/505.39, 505.46, 505.42; 251/362

(56) References Cited

U.S. PATENT DOCUMENTS

| 221,950 | * | 11/1879 | Woodruff .................... 137/505.41 |
| 3,369,562 | * | 2/1968 | Caparone et al. .......... 137/505.41 |
| 3,972,346 | * | 8/1976 | Wormser .................... 137/505.42 |
| 4,275,764 | | 6/1981 | Baret . |
| 4,770,393 | | 9/1988 | Hubertson . |
| 4,807,849 | | 2/1989 | Morgan . |
| 5,449,142 | | 9/1995 | Banick . |
| 5,458,001 | * | 10/1995 | Ollivier ........................... 73/715 |
| 5,492,146 | | 2/1996 | George et al. . |
| 5,732,736 | | 3/1998 | Ollivier . |
| 5,762,086 | | 6/1998 | Ollivier . |

FOREIGN PATENT DOCUMENTS

| 2 385 016 | 10/1978 | (FR) . |
| 2 090 380 | 7/1982 | (GB) . |

\* cited by examiner

Primary Examiner—Stephen Hepperle
(74) Attorney, Agent, or Firm—Oblon, Spivak, McClelland, Maier & Neustadt, P.C.

(57) ABSTRACT

A regulator for adjusting the pressure of a pressurized fluid wherein when a valve seat is fitted with a seat holder in a compressed state wherein excessive deformation of the valve seat due to a compressing reaction force is eliminated by the provision of a recessed groove is formed in the outer periphery of the valve seat. A compressing force by the seat holder is absorbed by compression deformation of the valve seat in the recessed groove portion of the valve seat.

9 Claims, 4 Drawing Sheets

REGULATOR

TECHNICAL FIELD

The present invention relates to a regulator for adjusting the pressure of pressurized fluid such as compressed air.

BACKGROUND ART

A regulator of this kind introduces pressurized fluid from an inlet port and regulates the pressure thereof to a set point to discharge the fluid from an outlet port. One example thereof is disclosed in U.S. Pat. No. 5,458,001. The regulator comprises a valve seat disposed in a fluid flow path interconnecting the inlet port and the outlet port, a diaphragm movably disposed in the outlet side of the valve seat, a poppet valve connected to the diaphragm for opening and shutting the valve seat from the inlet side by movement of the diaphragm, and a pressure-adjusting spring for urging the diaphragm in the direction that the poppet valve opens the valve seat. The poppet valve opens and shuts the valve seat an amount corresponding to the opening of the acting force difference between the outlet side fluid pressure mutually inversely applied to the diaphragm and the pressure-adjusting spring force, so that the fluid pressure in the inlet side is reduced to be regulated at a set point.

In the above-mentioned regulator, the valve seat is attached to a body via a dish-shaped seat holder having a central hole being a fluid flow path and a recess portion around the central hole. That is: the seat holder in a state that the valve seat is fitted into the recess portion is placed on the body; a cap is attached on the body in that state; and the body and the cap are clamped together by a nut-type clamping ring, so that the outer peripheral portion of the seat holder is fixed between the body and the cap in a highly pressurized state while the valve seat is fitted between the seat holder and the body in a compressed state.

However, in the method of fitting the valve seat via the seat holder in a compressed state, the seat holder is prone to be deformed by a compressing reaction force of the valve seat because when the clamping ring is strongly clamped, the valve seat is also strongly compressed by the seat holder, so that when the deformation is excessive, hermeticity between the valve seat and the seat holder or the body is likely reduced.

Since between the body and the cap, not only the outer peripheral portion of the seat holder but also the outer peripheral portion of the diaphragm is simultaneously clamped in a hermetic state, it is necessary that thickness of the seat holder is controlled with a high degree of accuracy so that the clamping force to the diaphragm is not reduced by the interposition of the seat holder, requiring troublesome processing.

DISCLOSURE OF INVENTION

In a type of regulator attaching the valve seat via the seat holder, a principal technical problem to be solved of the present invention is to fit the valve seat in a state maintaining high hermeticity by eliminating excessive deformation due to a compressing reaction force. In the above-mentioned regulator, another technical problem to be solved of the present invention is to fix both the diaphragm and the seat holder in a clamping state simultaneously and securely between the body and the cap without reducing hermeticity of the diaphragm.

In order to solve the above-mentioned problems, a regulator according to the present invention comprises: a seat holder fitted within the pressure chamber by clamping the fitting portion in the outer periphery thereof between the body and the cap; and a valve seat fitted between the seat holder and the body in a compressed state, wherein a recessed groove is formed in the outer periphery of the valve seat for absorbing an excessive compressing force by the seat holder.

In the regulator formed as described above, when the clamping ring is fastened, a compressing force acted on the valve seat via the seat holder is absorbed by elastic deformation of the valve seat in the recessed groove, so that the seat holder cannot be excessively deformed by a compressed reaction force of the valve seat. Therefore, deterioration due to the excessive deformation of hermeticity between the valve seat and the seat holder or the body cannot be produced.

According to a preferred embodiment of the present invention, the seat holder may be clamped between the body and the cap via an elastic washer.

By providing such with the washer, when the clamping ring is fastened, a clamping force acted on the seat holder is also absorbed and relieved by elasticity of the washer, resulting in easier and secure mounting of the valve seat and, moreover, such is accomplished with a high degree of accuracy. Furthermore, both the seat holder and the diaphragm can be securely and simultaneously fixed in a clamped state without reducing hermeticity of the diaphragm.

According to another preferred embodiment of the present invention, a bead may be formed on the surface of the body abutting the valve seat for improving hermeticity with the valve seat.

According to still another preferred embodiment of the present invention, the poppet valve having a conical sealing surface may comprise a flow-restricting portion close to the center of the conical surface in a portion fitting into the valve seat hole, the conical surface in the flow-restricting portion having a steeply inclined generating line.

Thereby, when the poppet valve opens, the flow-restricting portion is gradually shifting out of the valve seat hole, so that the valve seat hole is prevented from being opened suddenly. When the poppet valve shuts, the valve seat hole is also prevented from being closed suddenly owing to fitting of the flow-restricting portion into the valve seat hole gradually, resulting in a reduction in variations in pressure in the outlet side.

In this case, besides the flow-restricting portion of the poppet valve, or instead of the flow-restricting portion of the poppet valve, a flow-restricting portion may be formed in a portion of the valve stem located in the outlet side of the valve seat for restricting the flow of pressurized fluid by narrowing the flow path when the poppet valve fully opens.

According to a preferred specific embodiment of the present invention, a piston may be attached to the rear surface of the diaphragm while a sleeve for guiding is attached inside the cap, the piston being slidably inserted into the sleeve.

In this configuration, the diaphragm is guided by the sleeve and the piston, the displacement thereof is securely and steadily performed in the axial direction without inclination or lateral runouts, so that the poppet valve does not also incline or waggle laterally, thereby resulting in improved accuracy in pressure regulation by the stable and precise opening and shutting operations. Furthermore, localized wear due to deviated contact cannot be produced.

According to another embodiment of the present invention, the return spring may include at least one of a first return spring formed of a coil spring and a second return spring formed of a leaf spring.

BEST MODE FOR CARRYING OUT THE INVENTION

Several preferred embodiments of a regulator according to the present invention will be described in detail below with reference to the drawings.

Figure 1:
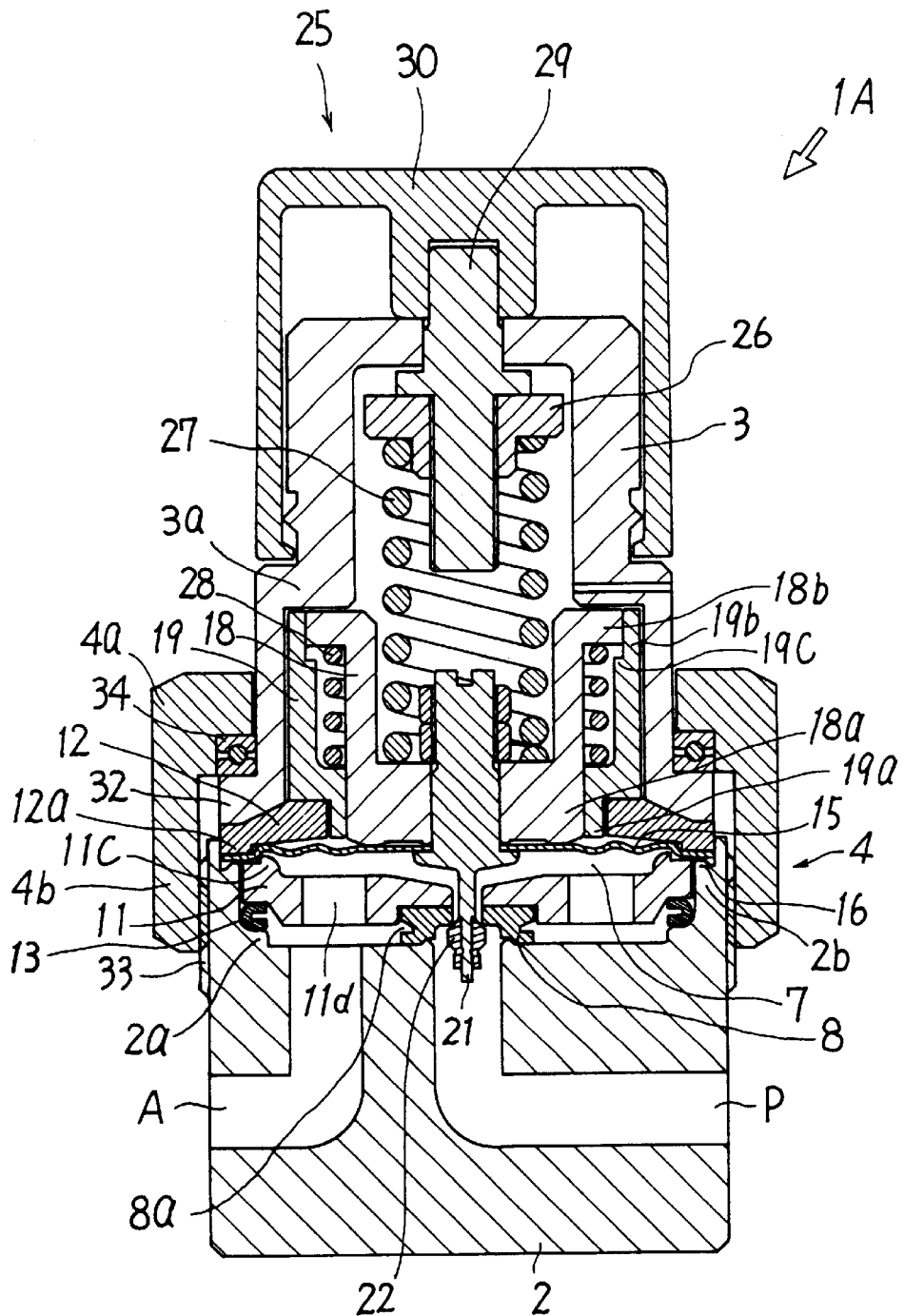
FIG. 1 is a sectional view showing a regulator according to a first embodiment of the present invention.
Figure 2:
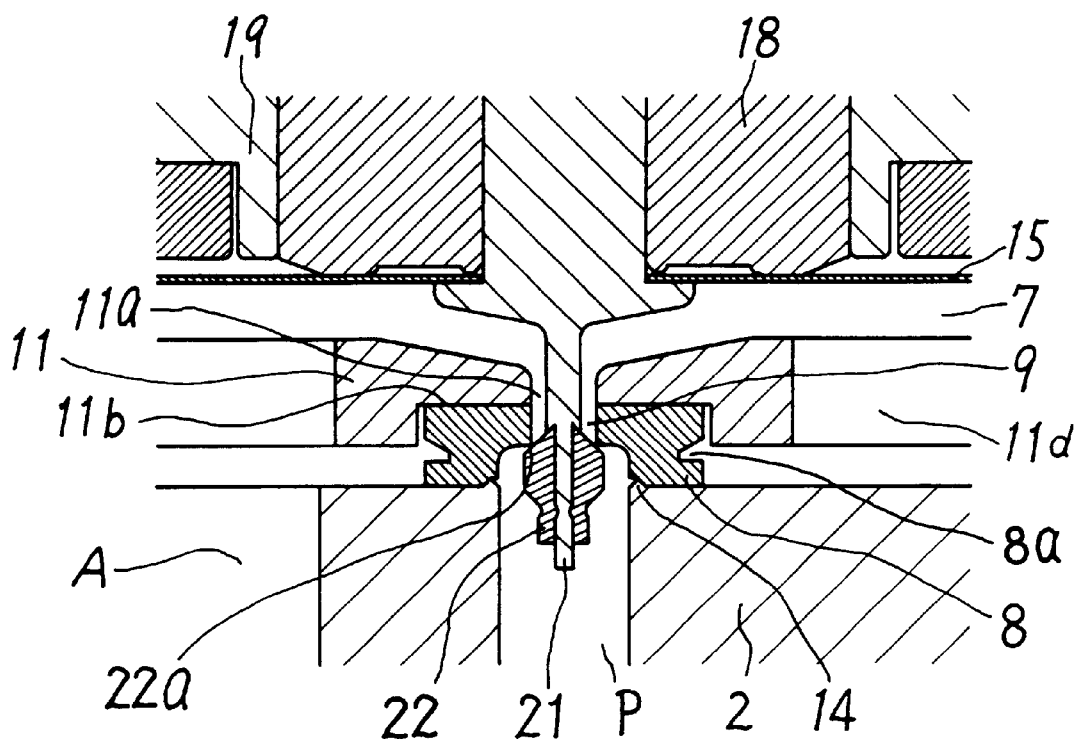
FIG. 2 is an exploded view of an essential part of FIG. 1.

FIGS. 1 and 2 show a first embodiment of the present invention. A regulator 1A according to the first embodiment comprises a short-columnar body 2, a cylindrical cover 3 connected to the top surface of the body 2, and a nut-type clamping ring 4 for detachably connecting the cap 3 to the body 2.

On side surfaces of the body 2, an inlet port "P" for introducing pressurized fluid and an outlet port "A" for discharging pressure-regulated pressurized fluid are formed. On the top surface of the body 2 is formed a pressure chamber 7 opened to these ports "P" and "A". Within the pressure chamber 7, a valve seat 8 is attached in a position opened to the inlet port "P". The inlet port "P" communicates with the pressure chamber 7 via a valve seat hole 9 in the center of the valve seat 8.

The valve seat 8 is circular as viewed in the plane having a recessed groove 8a in its outer peripheral surface for facilitating compressing deformation and is attached via a seat holder 11. The seat holder 11 is circular-plate-shaped having a central hole 11a in the center leading to the valve seat hole 9, a circular recess portion 11b surrounding the central hole 11a, and an annular fitting portion 11c in the outer peripheral portion. The seat holder 11 is attached between the body 2 and the cap 3 by clamping it between a step portion 2a of the body 2 for clamping and an annular clamping portion 12a of a spacer 12 forming a part of the cap 3 by the clamping ring 4 via an elastic metallic washer 13 having a U-shaped cross-section. Simultaneously, the valve seat 8 is attached in a compressed state between the recess portion 11b of the seat holder 11 and the body 2. It is desirable that an annular bead 14 be formed on the body 2 to improve hermeticity between the body 2 and the valve seat 8.

When the clamping ring 4 is fastened to attach the valve seat 8, a compressing force acted on the valve seat 8 via the seat holder 11 is absorbed by elastic deformation of the valve seat 8 in the recessed groove 8a, so that the seat holder 11 cannot be excessively deformed by a compressed reaction force of the valve seat 8.

Since the seat holder 11 is clamped between the body 2 and the cap 3 via the washer 13, when the clamping ring 4 is fastened, a clamping force acted on the seat holder 11 is also absorbed and relieved by elasticity of the washer, resulting in an easier and a more secure mounting of the valve seat 8 with high accuracy. Furthermore, both the seat holder 11 and a diaphragm 15, which is described later, can be securely and simultaneously fixed in a clamped state between the body 2 and the cap 3 without reducing hermeticity of the diaphragm 15.

The recessed groove 8 and the washer 13 are not necessarily disposed simultaneously and the problem of the present invention can be solved by utilizing at least only the recessed groove 8a.

In the drawings, numeral 11d indicates through-holes formed in the seat holder 11 for communicating the outlet side of the valve seat 8, which is the pressure chamber 7, with the outlet port "A".

In the outlet side of the valve seat 8, the diaphragm 15 for defining the top surface of the pressure chamber 7 is attached so as to be movable toward and away from the valve seat 8. The diaphragm 15 is attached by hermetically clamping its peripheral portion between an annular clamping portion 2b of the outer periphery of the body 2 and the annular clamping portion 12a of the outer periphery of the spacer 12. In order to improve hermeticity during the clamping, it is desirable that any one surface of those of the clamping portions 2b and 12a respectively formed on the body 2 and the spacer 12 be planar while a bead 16 be formed on the other. In the example shown in the drawing, the bead 16 is formed on the clamping portion 2b of the body 2.

In the central portion of the back of the diaphragm 15 is fitted with a piston 18 while between a step portion 3a of the cap 3 and the spacer 12 is fitted with a sleeve 19. Within the sleeve 19, the piston 18 is slidably accommodated. In the piston 18 and the sleeve 19, front end portions 18a and 19a having smaller diameters and rear-end portions 18b and 19b having a larger diameter are respectively formed. The piston 18 and the sleeve 19 are slidably made contact with each other in the two portions 18a/19a and 18b/19b, so that the piston 18 is guided to be precisely movable only in the axial direction without inclining and lateral runouts. On the inner surface of the sleeve 19 is formed a step portion 19c as a stopper for abutting the rear-end portion 18b when the piston 18 advances fully.

In the central front-end portion of the piston 18, a valve stem 21 is attached so as to protrude from the front surface of the diaphragm 15. The valve stem 21 extends so as to penetrate the valve seat hole 9 of the valve seat 8 with a poppet valve 22 disposed at one end thereof. The poppet valve 22 having a conical sealing surface 22a opens and shuts the valve seat hole 9 from the inlet side with the sealing surface 22a by the displacement of the diaphragm 15.

Between the back surface of the piston 18 and a spring seat 26, which is one of the members forming adjusting means 25, is disposed a pressure-adjusting spring 27 for urging the piston 18 in the opening direction of the poppet valve 22 while within the sleeve 19, between the inner peripheral surface of the sleeve 19 and the outer peripheral surface of the piston 18 is disposed a first return spring or valve 28 for urging the piston 18 in the closing direction of the poppet valve 22. One end of the return valve 28 is retained by the smaller diameter front-end portion 19a of the sleeve 19 while the other end thereof is retained by the larger diameter rear-end portion 18b of the piston 18. Any of the pressure-adjusting spring 27 and the return valve 28 is formed of a coil spring.

The adjusting means 25 comprises an adjusting screw 29 rotatably disposed in the central end portion of the cap 3, the above-mentioned spring seat 26 screwed to the adjusting screw 29 and movable by the rotation of the adjusting screw 29, and a dial 30 for rotationally operating the adjusting screw 29 from the outside of the cap 3. The adjusting means 25 establishes the outlet fluid pressure by adjusting the urging force of the pressure-adjusting spring 27 and constitutes a pressure setting mechanism along with the pressure-adjusting spring 27 and the return valve 28.

The above-mentioned clamping ring 4 interconnecting the body 2 and the cap 3 comprises an annular retaining portion 4a rotatably retained to an exterior flange 32 of the cap 3 in the peripheral end portion thereof and a female thread portion 4b screwed with a male thread portion 33 of the body 2 in its outer, periphery. Between the retaining portion 4a and the flange 32 of the cap 3, sliding-guiding means 34 formed of a bearing, etc., are interposed.

In the regulator 1A configured as above, when the piston 8 is pushed down by the pressure-adjusting spring 27 to displace the diaphragm 15 toward the valve seat 8, the poppet valve 22 separates from the valve seat 8 to open the valve seat hole 9, so that the pressurized fluid in the inlet side (inlet port "P") flows into the outlet side (outlet port "A") via the valve seat hole 9.

The fluid pressure in the outlet side is exerted on the diaphragm 15 to produce an operating force in the direction opposite to that by the pressure-adjusting spring 27 which in turn causes the poppet valve 22 to open the valve seat 8 an amount of corresponding opening to the acting force difference therebetween. While the fluid pressure in the outlet side is smaller than the set pressure, the poppet valve 22 opens to introduce the pressurized fluid from the inlet toward the outlet. When the fluid pressure in the outlet side increases to reduce the pressure difference with the set pressure, the diaphragm 15 moves away from the valve seat 8, so that the amount of opening of the poppet valve 22 decreases. When the pressure difference is reduced to zero to keep the operating forces in equilibrium, the poppet valve 22 closes to set the fluid pressure in the outlet side.

Since the diaphragm 15 is guided by the sleeve 19 via the piston 18, the displacement thereof corresponding to the outlet side pressure is securely and steadily performed only in the axial direction without inclination of the axial line or lateral runouts. In particular, since the piston 18 and the sleeve 19 are slidably made contact with each other in plural portions such as front-end portions 18a and 19a and rear-end portions 18b and 19b, the sliding is stable and inclination of the axial line can be securely prevented. Accordingly, the poppet valve 22 connected to the diaphragm 15 does not also incline or waggle laterally and is securely displaced only in the axial direction to open and shut the valve seat 8, thereby resulting in improved accuracy in pressure regulation by the stable and precise opening and shutting operations. Furthermore, since localized wear due to deviated contact cannot be produced, the durability can be also increased.

Since the full advancing position of the piston 18 is defined by the step portion 19c formed on the inner surface of the sleeve 19, even when the fluid pressure of the outlet side is suddenly decreased or when the outlet side becomes under zero pressure or vacuum, problems which may occur in that the diaphragm 15 or the piston 18 impacts the valve seat 8 or other members so as to be damaged or to produce dust, can be avoided with reliability.

Figure 3:
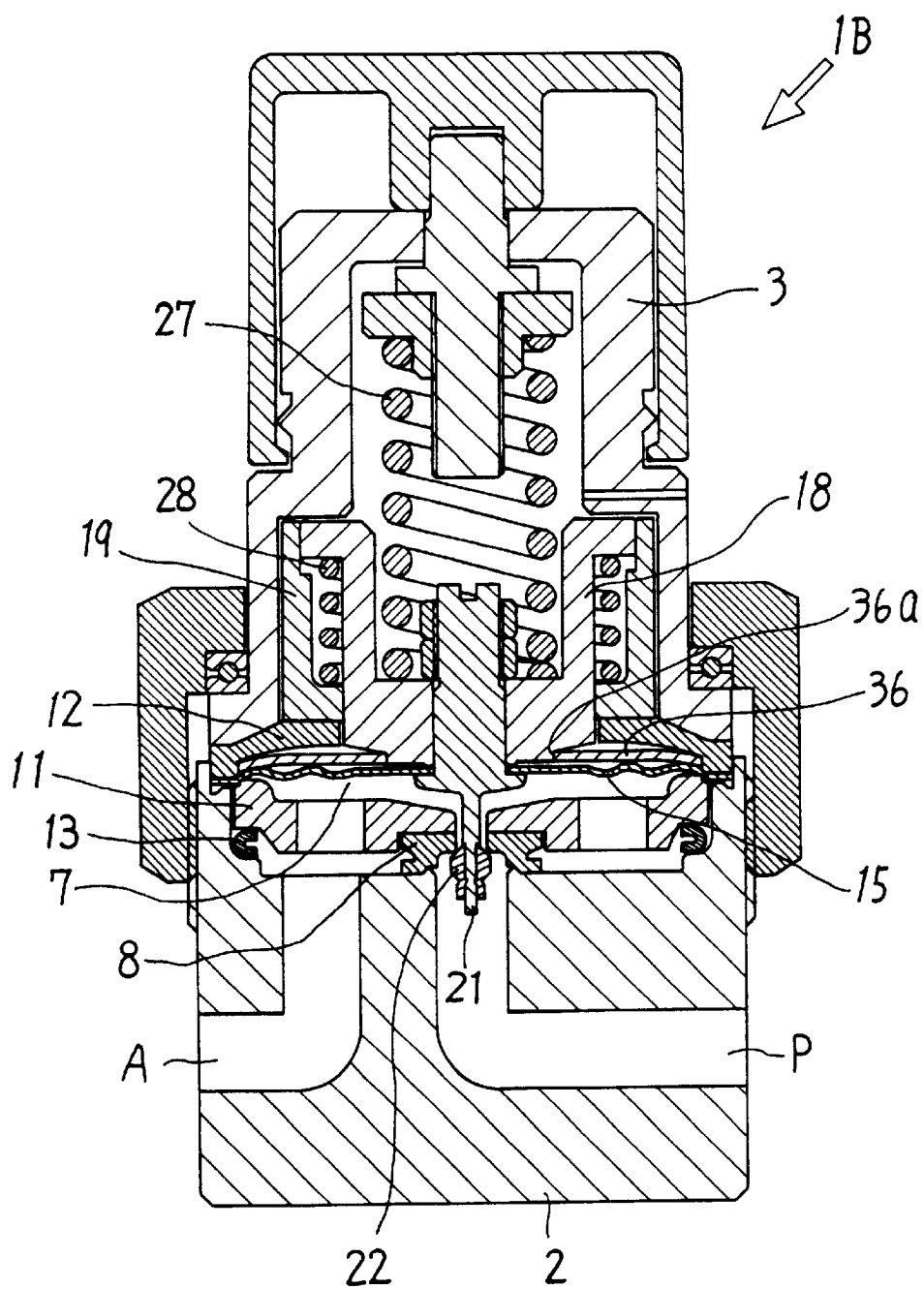
FIG. 3 is a sectional view showing a regulator according to a second embodiment of the present invention.

FIG. 3 shows a second embodiment of the present invention. A point of difference from the regulator 1B according to the second embodiment from the above-mentioned regulator 1A according to the first embodiment is that a second return spring 36 formed of a leaf spring is disposed therein in addition to the first return spring 28 being formed of a coil spring.

The leaf spring is formed in the scope of an annular ring and the front-end portion of the piston 18 is fitted into and retained in the central hole 36a of the spring while the outer peripheral portion thereof is retained within the inner peripheral surface of the spacer 12. Thereby, the leaf spring is closely attached to a position of the rear of the diaphragm 15 not obstructing normal deflection of the diaphragm 15.

The second return spring 36 also has a function in that when the diaphragm 15 is strongly urged by fluid pressure, excess deflection thereof is prevented by supporting it from the rear in addition to the function of urging the piston 18 in the returning direction in cooperation with the first return spring 28.

In addition, when the leaf spring-type second return spring 36 is provided, the first return spring 28 formed of a coil spring may be eliminated.

Since the configuration except for the above-noted point is substantially the same as that of the regulator 1A according to the first embodiment, like reference characters designate like principal portions common to those of the first and second embodiments, and thus a description thereof is abbreviated.

Figure 4:
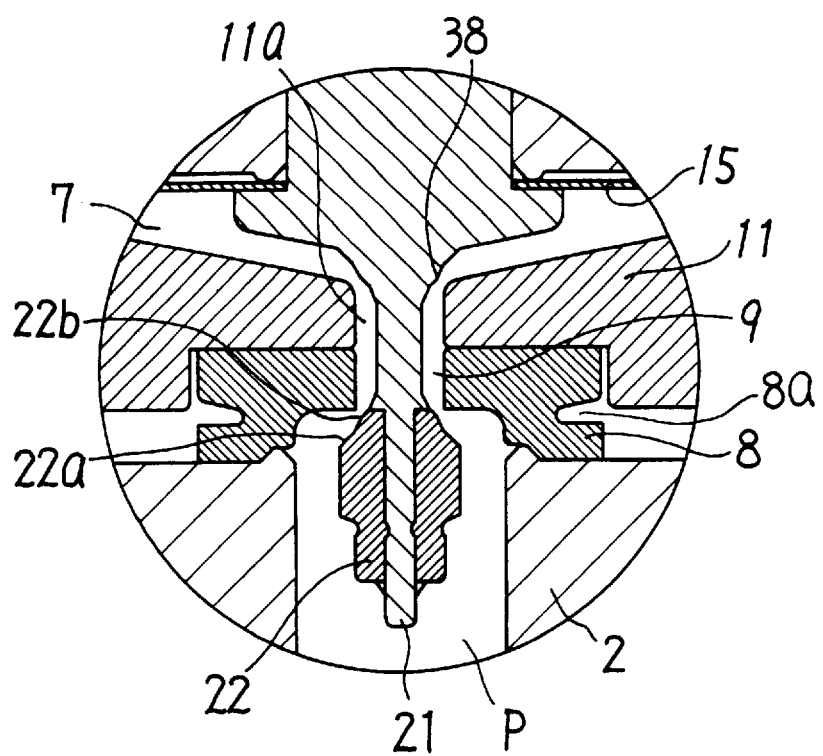
FIG. 4 is a sectional view of an essential part of a regulator according to a third embodiment of the present invention.

FIG. 4 shows an essential part of a regulator according to a third embodiment. In the regulator according to the third embodiment, a flow-restricting portion is formed in the poppet valve 22 according to above-mentioned each embodiment. That is, in a portion close to the center (inside), i.e., a portion fitting into the valve seat hole 9, on the conical sealing surface 22a of the poppet valve 22, a flow-restricting portion 22b, in which a generating line is steeply inclined, is formed.

When the poppet valve 22 opens, the valve seat hole 9 is gradually opened owing to the flow-restricting portion 22b so that pressurized fluid is prevented from flowing into the pressure chamber 7 suddenly. When the poppet valve shuts, the valve seat hole 9 is also gradually closed owing to the flow-restricting portion 22b so that pressurized fluid is prevented from being suddenly intercepted. Consequently, not only sudden variations in pressure accompanied with opening and shutting of the poppet valve 22 are prevented but also enfolding dust due to sudden variations in flow, losing flow uniformity due to generation of turbulence, and so forth can be securely avoided.

The flow-restricting portion described as above may also be formed in the outlet side of the valve seat 8. That is, as shown in FIG. 4, the flow-restricting portion 38 having a conical surface may be formed in a portion of the base end side of the valve stem 21 located in the pressure chamber 7, so that the opening area of the central hole 11a of the seat holder 11 is throttled by the flow-restricting portion 38 when the poppet valve 22 is fully opened.

In this manner, by forming the flow-restricting portion 38 in the outlet side of the valve seat 8, the flow when the poppet valve 22 is fully opened is restricted so that sudden variations in pressure can be more effectively prevented. That is, when fluid pressure in the outlet side is largely reduced and thereby the poppet valve 22 is fully opened to supply the maximum flow, enfolding dust due to sudden variations in flow, losing flow uniformity due to generation of turbulence are prone to be generated. However, the pressure rises smoothly because the opening area of the central hole 11a is throttled by the flow-restricting portion 38 to restrict the flow.

In addition, the flow-restricting portion 38 may be jointly formed with the flow-restricting portion 22b in the poppet valve 22 or may be formed instead of the flow-restricting portion 22b.

As described above, according to the present invention, since a compressing force acted on the valve seat via the seat holder when attaching the valve seat is absorbed with the recessed groove formed in the valve seat, the seat holder cannot be excessively deformed by the compressed reaction force of the valve seat.

Since the seat holder is clamped between the body and the cap via the washer, a clamping force acted by the clamping ring on the seat holder can also be absorbed and relieved by elasticity of the washer, resulting in easier and secure mounting of the valve seat and moreover with high accuracy. Furthermore, both the seat holder and the diaphragm can be securely and simultaneously fixed in a clamped state between the body and the cap without reducing the hermeticity of the diaphragm.

What is claimed is:

1. A regulator comprising:

a body;

a cap connected to said body in a clamping state with a nut-type clamping ring;

an inlet port formed in said body;

an outlet port formed in said body;

a pressure chamber communicated by said inlet port and said outlet port;

a circular seat holder having a central hole, a recess portion around the central hole, and a fitting portion at the periphery, said seat holder being fitted within said pressure chamber by clamping the fitting portion between said body and said cap;

a valve seat fitted between said seat holder and said body in a position of said pressure chamber opened to said inlet port in a compressed state upon being fitted into the recess portion of said seat holder;

a recessed groove formed in the outer periphery of said valve seat for absorbing an excessive compressing force by said seat holder;

a diaphragm attached in the outlet side of said valve seat by clamping the outer peripheral portion of said diaphragm between said body and said cap in a hermetic state, said diaphragm being movable toward and away from said valve seat;

a valve stem protruding forward from said diaphragm and extending so as to penetrate a valve seat hole in said valve seat;

a poppet valve disposed in the end portion of said valve stem for opening and shutting the valve seat hole from the inlet side by the movement of said diaphragm; and a pressure-setting mechanism including: a pressure-adjusting spring for urging said diaphragm in the direction that said poppet valve opens; a return spring for urging said diaphragm in the direction that said poppet valve closes; and an adjusting mechanism for adjusting the urging force of the pressure-adjusting spring.

2. A regulator according to claim 1, wherein a bead is formed on the surface of said body abutting said valve seat for improving hermeticity with said valve seat.

3. A regulator according to claim 1, wherein said poppet valve having a conical sealing surface comprises a flow-restricting portion close to the center of the conical surface in a portion fitting into the valve seat hole, the conical surface in the flow-restricting portion having a steeply inclined generating line.

4. A regulator according to claim 1, wherein a flow-restricting portion is formed in a portion of said valve stem located in the outlet side of said valve seat for restricting the flow of pressurized fluid by narrowing the flow path when said poppet valve fully opens.

5. A regulator according to claim 1, which comprises a piston attached to the rear surface of said diaphragm and a sleeve for guiding said piston which is attached inside said cap, the piston being slidably inserted into the sleeve.

6. A regulator according to claim 1, wherein the return spring includes at least one of a first return spring formed of a coil spring and a second return spring formed of a leaf spring.

7. A regulator according to claim 1, wherein said seat holder is clamped between said body and said cap via an elastic washer.

8. A regulator according to claim 1, wherein said body comprises a bead for improving hermeticity with said valve seat on the surface of said body abutting said valve seat, wherein said poppet valve comprises a conical sealing surface having a flow-restricting portion close to the center of the conical surface in a portion fitting into the valve seat hole, the conical surface in the flow-restricting portion having a steeply inclined generating line, wherein said valve stem comprises a flow-restricting portion for restricting the flow of pressurized fluid by narrowing the flow path when said poppet valve fully opens in a portion of said valve stem located in the outlet side of said valve seat, and wherein a piston is attached to the rear surface of said diaphragm and a sleeve for guiding said piston is attached inside said cap, the piston being slidably inserted into the sleeve.

9. A regulator according to claim 2, which comprises an elastic washer wherein said holder is clamped between said body and said cap via said elastic washer.

* * * * *